May 26, 1959  W. M. BROBECK  2,888,565
CALUTRON
Filed June 10, 1946  4 Sheets-Sheet 1

INVENTOR.
WILLIAM M. BROBECK
BY
ATTORNEY.

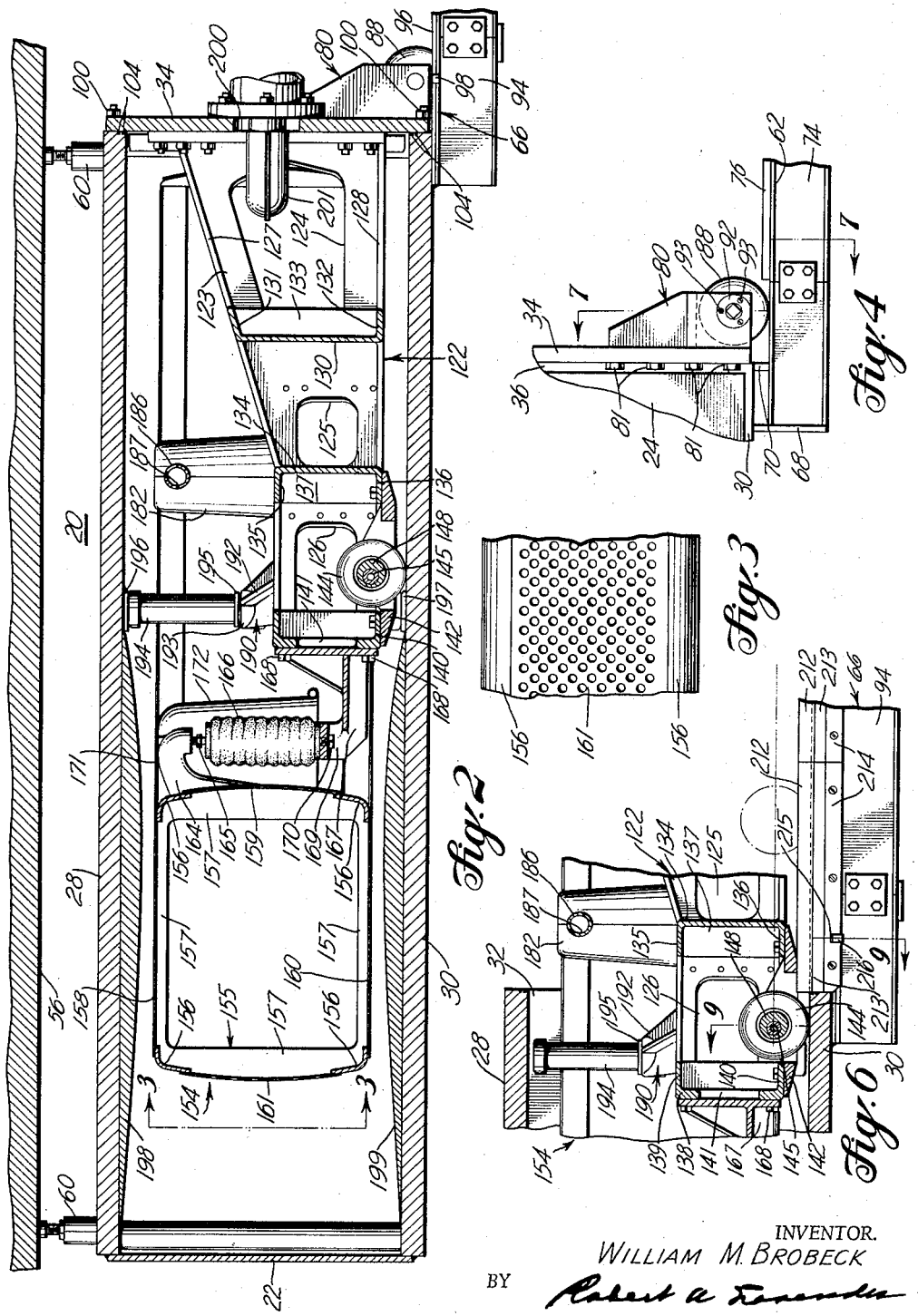

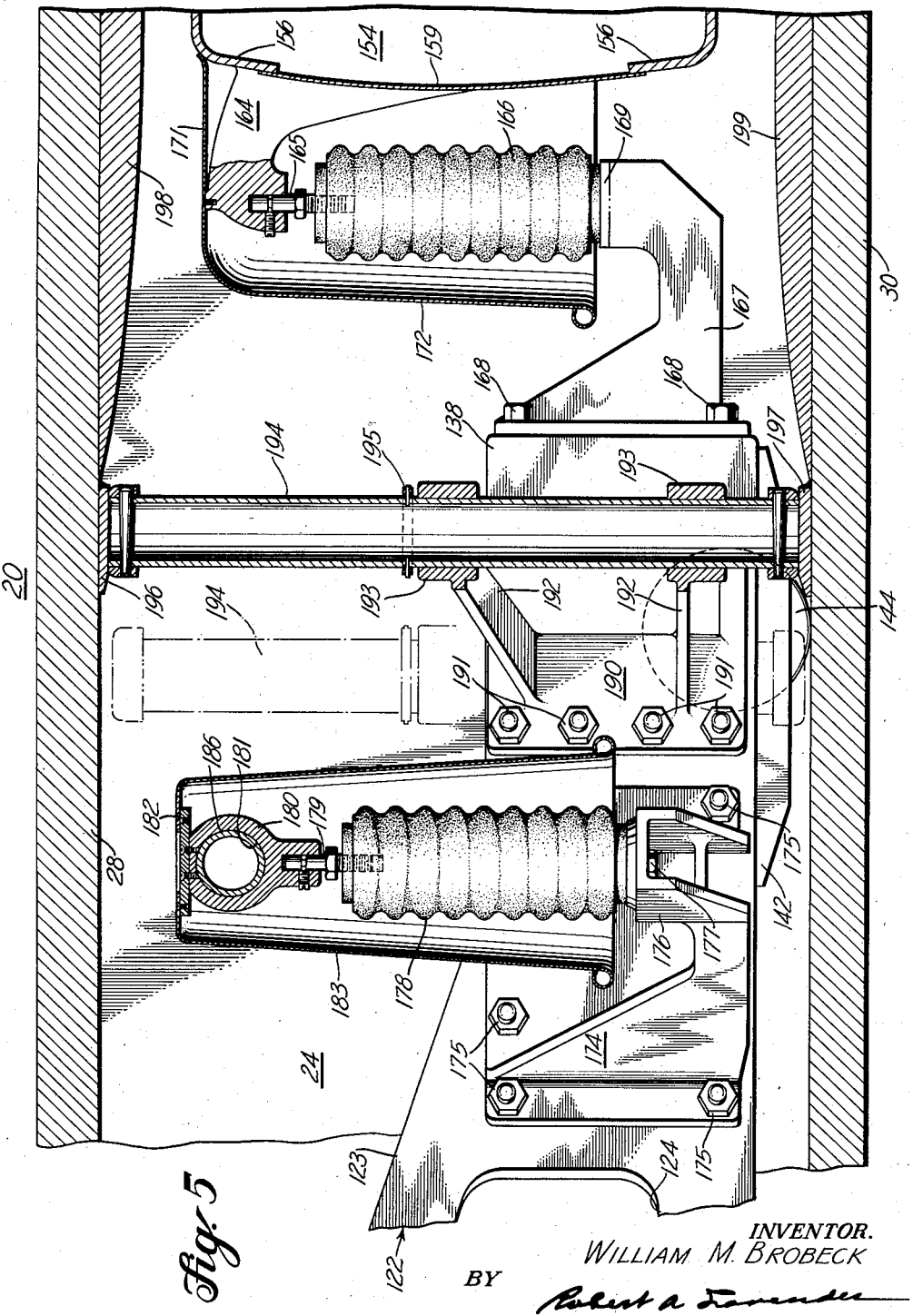

May 26, 1959   W. M. BROBECK   2,888,565
CALUTRON
Filed June 10, 1946   4 Sheets-Sheet 4

INVENTOR.
WILLIAM M. BROBECK
BY
ATTORNEY.

United States Patent Office 2,888,565
Patented May 26, 1959

2,888,565
CALUTRON

William M. Brobeck, Berkeley, Calif., assignor to the United States of America as represented by the United States Atomic Energy Commission Application June 10, 1946, Serial No. 675,793

17 Claims. (Cl. 250—41.9)

The present invention relates to improvements in calutrons and more particularly to improvements in the type of calutron disclosed in U.S. Patents Nos. 2,709,222 and 2,714,664, which were respectively issued to Ernest O. Lawrence, on May 24, 1955 and August 2, 1955.

The underlying theory and principles of operation of a calutron are fully and completely set forth in those patents and will not be here repeated. It may be stated generally, however, that the calutron to which this invention relates comprises essentially an evacuated vessel disposed in a strong magnetic field and including ion beam transmitting mechanism and ion receiving mechanism. The purpose of such calutrons is to treat polyisotopic substances to produce a plurality of segregable masses wherein the distribution of the constituent isotopes has been altered so that one of the masses produced has been enriched with respect to at least one isotope, and to produce such masses in microscopic or commercial quantities.

The improved calutron of this invention contemplates massive structures which will be subjected to strong forces, both in the nature of the associated magnetic field and the pressure resulting from the high degree of vacuum employed, and yet quite exact alignment of the constitutive members is required for its proper functioning. Furthermore, certain elements of the device, such as, for example, the liner and the accelerating electrodes, are required to be maintained at high electrical potentials necessitating mounting them on suitable electrical insulators which still possess sufficient strength to support their masses.

This invention relates particularly to such a massive calutron providing suitable means for supporting and aligning the component elements for convenient inspection and servicing and suitable means for supporting and electrically insulating the elements thereof maintained at high potentials.

It is, accordingly, one object of this invention to provide a calutron of massive structure wherein the operative elements, including the ion beam transmitter, the ion receiver and their associated liner are securely and firmly mounted in place, yet are readily removable from the vessel for inspection, servicing and repair.

It is another object of this invention to provide such a calutron wherein the entire internal operative structure is mounted for ready movement into and out of place and is positively guided through such movement.

It is another object of this invention to improve the electrical insulation, the rigidity and the supporting mechanism of the C-shaped liner employed therein.

An important feature of the invention is the means provided to support the walls of the vessel against the collapsing pressure of the high degree of vacuum employed.

Further objects, advantages and features will be apparent from the annexed specification wherein:

Fig. 2 is an enlarged vertical section taken on the line 2—2 of Fig. 1;

Fig. 3 is a fragmentary end elevation of the C-liner taken on the line 3—3 of Fig. 2;

Fig. 4 is an enlarged fragmentary elevation of the left face plate wheel and associated track taken on the line 4—4 of Fig. 1;

Fig. 5 is an enlarged vertical, fragmentary section taken along the line 5—5 of Fig. 1;

Fig. 6 is an enlarged vertical fragmentary section taken on the line 6—6 of Fig. 1;

Figure 1:
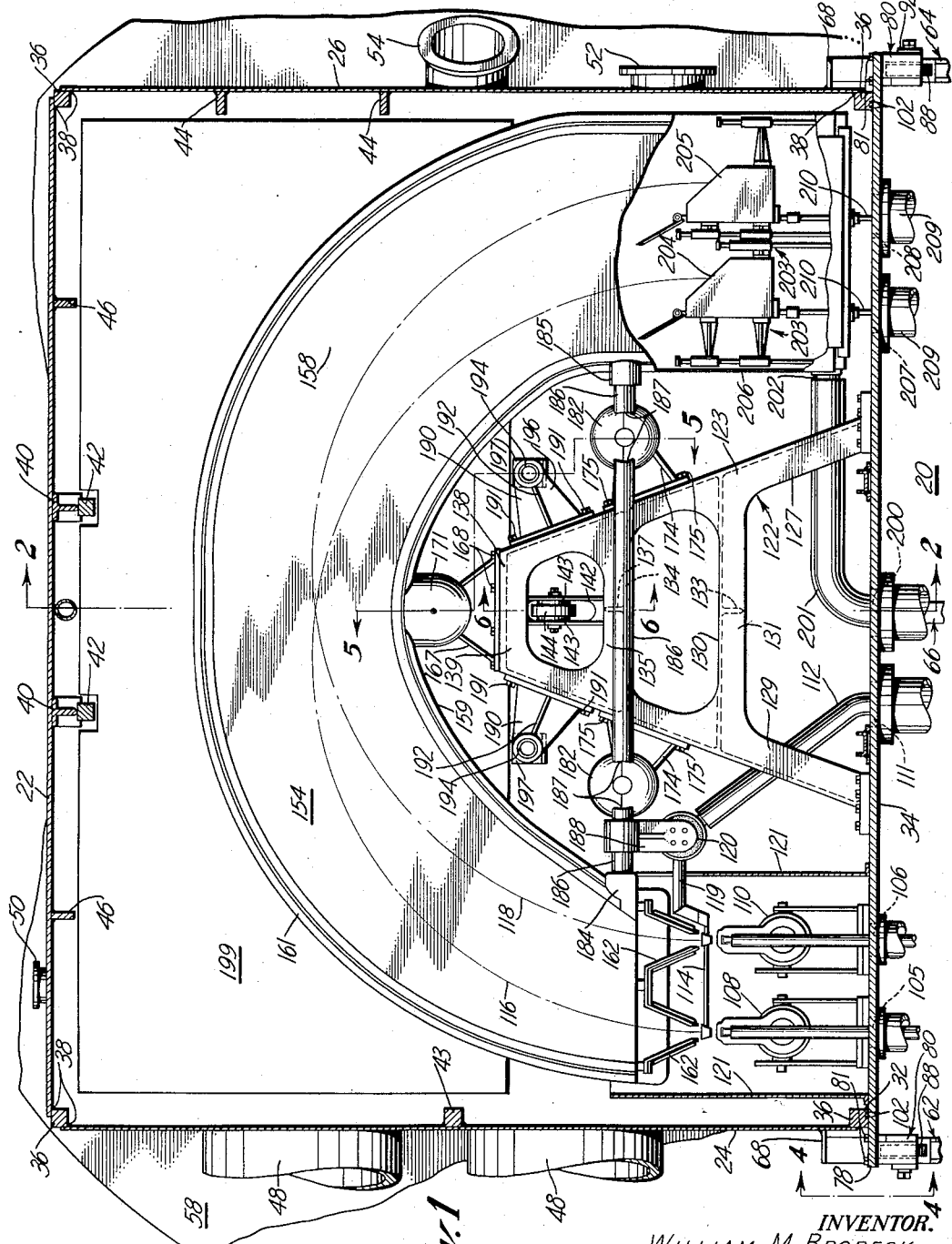
Figure 1 is a horizontal sectional view of a calutron embodying the present invention.

Referring more particularly to the drawings, there is illustrated a calutron including a vessel designated generally as 20 and including a rear wall 22, a left wall 24, a right wall 26, upper wall 28, and bottom wall 30, defining an apertured vessel having an opening 32 adapted to be hermetically sealed by a removable face plate 34. A plurality of corner posts 36 are provided, one in each corner of the vessel and the walls 22, 24 and 26 are secured thereto by welding, as indicated at 38. A pair of vertically disposed T beams 40 are provided re-enforcing the rear wall 22 and abutting a pair of vertically disposed posts 42. A similar post 43 is provided abutting the left wall 24 and a pair of reenforcing ribs 44 are provided re-enforcing the right wall 26, and a similar pair of ribs 46 may be provided re-enforcing the rear wall 22.

The vessel or tank 20 is provided with a pair of large tubular conduits 48 leading to suitable vacuum apparatus (not shown) by means of which the tank may be exhausted. In practice, a vacuum of the order of $10^{-4}$ to $10^{-5}$ mm. Hg is employed, necessitating sturdy construction of the vessel 20 as well as the various re-enforcing posts, ribs and column provided.

Furthermore, the tank 20 is preferably provided with a pair of viewing ports 50 and 52 disposed in alignment with the source mechanism and the receiver mechanism, through which operation of the calutron may be observed.

A port 54 is provided in the right wall 26 for the insertion of suitable liquid air or liquid nitrogen traps (not shown) by means of which any moisture remaining in the vessel 20 after "backng out" and pumping down may be condensed.

The vessel 20 is adapted to be positioned between the upper and lower pole faces 56 and 58, respectively, of a powerful electromagnet (not shown). This electromagnet when energized is designed to create a magnetic field through the vessel 20 of approximately the order of 4000 gauss and as the upper and lower walls 28 and 30 are preferably formed of magnetic steel, so as in effect to constitute continuation of the pole pieces, again the vessel 20 must be extremely sturdy in construction to resist the resultant disruptive force. Generally, the vessel 20 is positioned within the magnet with the lower wall 30 resting directly upon the lower pole face 58 while suitable mechanism, such as the locking expansive members 60, is provided to securely wedge the vessel against the upper pole piece 56 and retain it in position.

Associated with the vessel 20 is a track system including a left-hand track 62, a right-hand track 64 and a center track 66. Each of the tracks 62 and 64 extends forwardly from its respective side of the vessel 20 and is secured to the forward part of the bottom wall 30, as indicated, by means of brackets 68 depending from the bottom wall 30 of the vessel 20 and brackets 70 also depending from the bottom wall 30, the two brackets being braced by a web 72. The tracks 62 and 64 are formed, as shown, by means of I beams 74 to the top of which are welded rectangular rods 76.

The face plate 34 has overlapping ends 78 and brackets 80, extend forwardly therefrom and are secured thereto by means of studs 81. The brackets 80 include wheel boxes 82 which carry roller bearings 84. A shaft 86 is mounted to rotate in the bearings 84 and has a wheel 88 keyed to the shaft 86 by a key 90. The wheel assembly is retained in place by means of a ring 92 secured to the box 82 by machine screws 93.

It will be understood that each of the overlapping ends 78 of the face plate 34 thus carries a similar wheel 88 running respectively in the tracks 62 and 64.

The center track 66 is likewise formed of an I beam 94 to the top of which is welded a strip 96. As shown in Fig. 2, the track 66 terminates adjacent the front of the vessel 20 and is secured to the bottom wall 30 thereof. The track 66 is provided with a pair of L-shaped lugs 98 welded on either side of the strip 96 slightly in advance of the front of the vessel 20, for a purpose hereinafter described.

The face plate 34 is adapted to be removably secured to the vessel by means of studs 100 threading into corner posts 36 and to the top and bottom walls 28 and 30. The forward corner posts 36 are provided with sealing gaskets 102 and similar sealing gaskets 104 are provided in the front edges of top and bottom walls 28 and 30 to maintain the vacuum-tight integrity of the vessel when the face plate 34 is in place.

Referring particularly to Figs. 1 and 2, the face plate 34 is apertured, as at 105 and 106, to provide entrance for the leads to ion sources 108 and 110 which are mounted on the inner side of the face plate, as shown. The ion source mechanism, per se, forms no part of the particular invention and is therefore illustrated only diagrammatically. It may be noted, however, that such source mechanism includes means for vaporizing a supply of the material being treated and means for ionizing the vapor thus produced. Furthermore, the face plate 34 is apertured, as at 111, to provide entrance for the high voltage lead 112 which provides the potential for the accelerating mechanism 114. The accelerating mechanism, per se, similarly forms no part of the present invention but it is noted that by this mechanism, a beam of positive ions is withdrawn from each of the sources 108 and 110 and projected into paths, indicated at 116 and 118. The accelerating mechanism is mounted on a tube 119 supported from insulator 120. The inner end of lead 112 is also supported from insulator 120 and communicates with the tube 119 to form the complete lead to the accelerating mechanism 114. A shield, or "gunk-catcher" 121 is mounted on the face plate 34 and substantially surrounds the source mechanisms 108 and 110 for the purpose of collecting any un-ionized vapors and keeping them from contaminating other parts of the calutron.

Mounted on the inner side of the face plate 34 is an A-frame 122. The A-frame 122 includes a right-hand leg 123 having a cut-out portion 124, and two smaller cut-out portions 125 and 126, and an upper inturned flange 127 and a lower inturned flange 128. The left-hand leg 129 is similarly constructed. A cross-piece 130, having an upper forwardly turned flange 131 and a lower forwardly turned flange 132 and a central vertically disposed rib 133 is provided across the legs of the A-frame. A second cross-piece 134 having an upper rearwardly turned flange 135, a lower rearwardly turned flange 136 and a central vertically disposed rib 137 is provided across the legs of the A-frame spaced inwardly from the cross-piece 130. The innermost portion of the legs of the A-frame 122 is closed by a cross-piece 138 having an upper forwardly turned flange 139, a lower forwardly turned flange 140 and a central cut-out portion 141.

Figure 10:
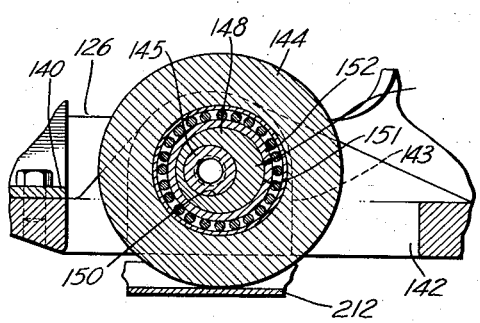
Fig. 10 is a fragmentary vertical section taken on the line 10—10 of Fig. 9.
Figure 9:
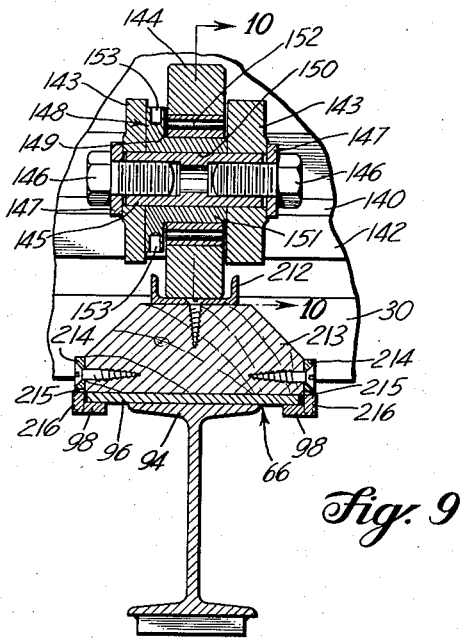
Fig. 9 is an enlarged fragmentary vertical section taken on the line 9—9 of Fig. 6.
Figure 7:
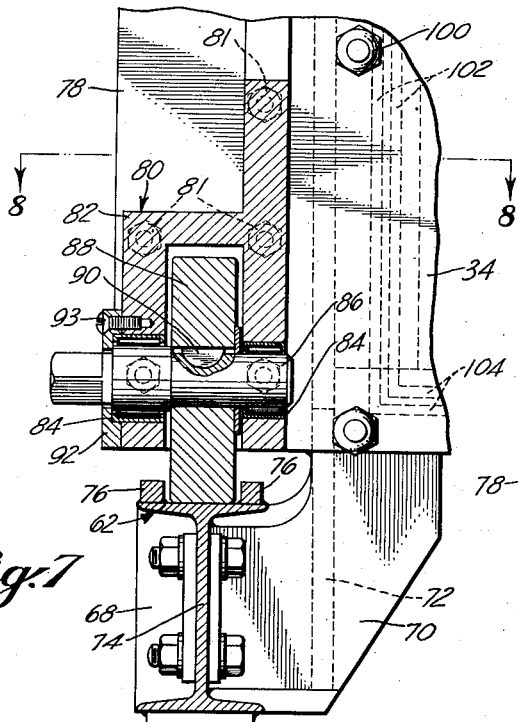
Fig. 7 is an enlarged vertical fragmentary section taken on the line 7—7 of Fig. 4.
Figure 8:
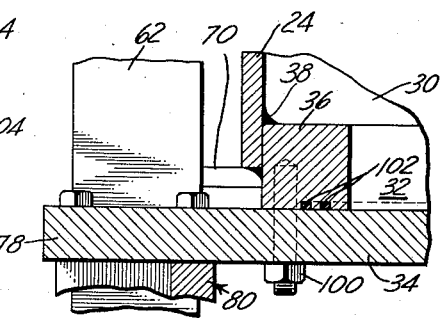
Fig. 8 is a fragmentary section taken on the line 8—8 of Fig. 7.

Bolted to the bottom of the flanges 136 and 140 is a wheel support 142 including a pair of spaced-apart frame members 143 between which is mounted a wheel 144. Referring particularly to Figs. 9 and 10, the wheel 144 has an eccentric mounting by means of which it may be adjusted vertically to regulate the vertical position of the inner end of the A-frame. A sleeve 145, having female threads to receive bolts 146, is mounted in suitable holes in the frame members 143. Washers 147 are provided to be engaged by the heads of bolts 146. An eccentric 148, having a flange 149 and a bore 150 is mounted on the sleeve 145 and between the members 143, as shown. The eccentric 148 has a trunnion 151, on which is mounted the pin-bearing 152 of wheel 144. The flange 149 is provided with a pair of shallow bores 153 for engagement by a suitable tool, by means of which the eccentric 148 may be turned upon the sleeve 145. When the eccentric 148 is thus properly positioned, it is retained in place by applying tension upon the bolts 146, clamping the eccentric between the members 143.

A hollow liner, designated generally as 154, having a generally C-shaped configuration, is mounted on the A-frame 122 as hereinafter described. The liner 154 includes corner pieces 156 and a number of "picture frame" sections 155 including inwardly extending ribs 157. The liner 154 also includes an upper wall 158, an inner wall 159 and a lower wall 160 formed of nonmagnetic material such as copper, brass or the like. The outer wall 161 of the liner is perforated throughout its length, as indicated in Fig. 3, to provide ample means for the escape of gases from the liner to facilitate pumping the calutron down to the required high vacuum.

Adjacent the source end, the liner 154 is provided with a pair of electrodes 162 aligned with slits in the accelerating mechanism 114 for a purpose immaterial to the present invention. Adjacent the receiver end, the liner 154 extends nearly to but not into contact with the face plate 34, thus providing a shield or gunk catcher adjacent the receiver mechanism. The inner wall 159 of the liner 154 is provided adjacent its mid-point with a depending bracket 164 adapted to receive a pin 165 extending into ceramic insulator 166. A bracket 167 is bolted to the cross piece 138 of the A-frame 122, as by bolts 168, and includes an upturned seat 169 to which the bottom of the insulator 166 is suitably fastened, as by means of cap screw 170, as shown. A cap or shield 171 having a depending skirt 172 is fastened to the bracket 164 and substantially surrounds the insulator 166 with an equi-potential surface, in order to reduce the chance of sparking over.

Each leg 123 or 129 of the A-frame 122 carries a bracket 174 extending laterally from the A-frame and secured to the legs by stud bolts 175. Each bracket 174 includes an upturned seat 176 to which is secured, as by cap screw 177, the lower end of a ceramic insulator 178. A pin 179 is affixed in the top of insulator 178 and carries a bracket 180 having an aperture 181 therein. A split cap or shield 182 having a generally cylindrical but slightly flaring skirt 183 is affixed to the bracket 180, as shown, and protects the insulator 178.

Secured to the inner wall 159 of the liner 154 adjacent the source end thereof is a socket 184 and diametrically across the C-shaped liner 154, a similar socket 185 is also secured to the liner wall 159. A tubular tie-bar 186 is seated in and welded to sockets 184 and 185 and extends across the diameter of the liner 154. The tie-bar extends through suitable apertures 187 in the caps 182 of insulators 178 and is supported in the apertures 181 of the brackets 180.

Adjacent the source end of the liner, the tie-bar 186 carries a depending bracket 188 from which is suspended insulator 120.

Each leg of the A-frame 122 also carries a laterally extending bracket 190 secured thereto by stud bolts 191. Referring particularly to Fig. 5, the brackets 190 include spaced-apart arms 192, terminating in sleeves or bearings 193 in which are slidably mounted floating columns 194. A stop 195 may be keyed to the columns 194, as shown, to limit the amount of vertical movement of the columns 194 in the bearings 193.

The vessel 20 carries a pad 196 depending from its top wall 28 and a pad 197 affixed to its bottom wall 30. The pads 196 and 197 are bevelled on their front edges, as shown, and are adapted to be engaged by the floating columns 194 when the face plate 34 is secured in position. The columns 194 thus serve to support the vessel, at a central position therein, from the collapsing force of the high vacuum employed, and yet do not interfere with the ready removal of the face plate 34 and its associated mechanism, such as the liner 154.

The vessel 20 may be provided, as shown, with magnetic shims 198 and 199 for the purpose of altering the magnetic flux passing through the liner 154 in the regions traversed by the beams 116 and 118 in accordance with predetermined criteria. These shims form the subject matter of U.S. Patent No. 2,719,924, issued to J. Robert Oppenheimer et al. on October 4, 1955, and form no part of the present invention. The liner 154 is adapted to be maintained at a high negative potential with respect to the vessel 20 and, to this end, the face plate 34 is apertured, as at 200, to provide an opening for the high voltage lead 201 which contacts the liner, as at 202.

A pair of ion receivers 204 and 205 adapted to receive the ions from beams 116 and 118, respectively, and to de-ionize them and collect samples of the charge material treated in accordance with the principles set forth above are mounted within the extended portion 206 of liner 154 and supported therein and from the face plate 34 by means of a bracket structure, indicated at 203. The face plate 34 is apertured at 207 and 208 to provide leads 209 for the operating controls 210 of the receivers. The receiver structure, per se, forms no part of the present invention, but is the subject matter of U.S. Patent No. 2,727,152, which was issued to Sidney W. Barnes and William M. Brobeck, on December 13, 1955.

When the mechanism above described is in position, as indicated in Figs. 1 and 2, the wheel 144 carred by the A-frame 122 rides on the upper surface of bottom wall 30, but on removal of the unit from the vessel or on installing it, the wheel 144 rides off of the wall 30 and onto the track carried by the I beam 94. Clearance must be provided, however, for the lower edge of the face plate 34. Referring particularly to Figs. 6 and 9, it will be noted that there is provided a track 212 secured to a block 213 having flanges 214 secured to its opposite edges. The flanges 214 are notched, as at 215, to engage with the upstanding arms 216 of lugs 98, thus securing the blocks 213 and their associated tracks 212 to the strip 96.

Referring particularly to Fig. 6, the unit is shown with the mechanism nearly retracted from the vessel 20. The face plate 34 will have passed over the section of track shown, thus enabling the placing of the blocks 213 carrying the tracks 212 on the strip 96. The blocks 213 and their associated tracks 212 are conveniently made in short sections for ease in inserting and removing. By means of this last described mechanism, wheel 144 can be raised to the level of the bottom wall 30 and ridden thereon and the blocks 213 then removed to provide clearance for the lower edge of the face plate 34.

As previously pointed out, the calutron of this invention is massive in character and subject to extreme stresses. The vessel 20, as built, was 24" by 99" by 132" and the diameter of the pole faces 56 and 58 was 184". As will be understood, the successful operation of this unit depends upon a nice adjustment of the accelerating potential, the magnetic field strength and the positioning of the orifices of the source units and the receiver units in exactly the position required by the underlying mathematical concepts. Furthermore, it was necessary to provide easy access to the interior mechanism for loading, unloading, servicing and cleaning. To this end, there has been provided the above-described means of mounting the interior mechanism on the removable face plate 34 and its associated A-frame 122 and there has been provided the wheel mechanisms 88 and 144 and the associated tracks 62, 64 and 212, by means of which the entire assembly is mounted for quick removal and is positively guided to and from its proper operating position. Furthermore, it will be apparent that the above-described functions have been achieved concurrently with mounting the cumbersome liner 154 and the accelerating mechanism 114 in a safely electrically insulated manner sufficient to insure against shorting out or sparking out the unit.

While there has been described what is at present considered a preferred embodiment of the invention, it will be understood that various modifications may be made therein, and it is intended to cover in the appended claims all such modifications as fall within the true spirit and scope of the appended claims.

What is claimed is:

1. A calutron comprising a vessel provided with an opening, a removable face plate hermetically sealing said opening, an ion beam transmitter disposed within said vessel and mounted on said face plate, an ion receiver disposed within said vessel and mounted on said face plate, and a hollow liner extending between said transmitter and said receiver and supported by said face plate.

2. A calutron comprising a vessel provided with an opening, a removable face plate hermetically sealing said opening, an ion beam transmitter disposed within said vessel and mounted on said face plate, an ion receiver disposed within said vessel and mounted on said face plate, and a hollow liner extending between said transmitter and said receiver and supported by said face plate in electrically insulated relation thereto and to said vessel.

3. A calutron comprising a vessel provided with an opening, a removable face plate hermetically sealing said opening, an ion beam transmitter disposed within said vessel and mounted on said face plate, an ion receiver disposed within said vessel and mounted on said face plate, and a hollow liner extending between said transmitter and said receiver, a support frame mounted on said face plate and supporting said liner in electrically insulated relation to said face plate and said vessel.

4. A calutron comprising means defining a vessel and including upper and lower walls, said vessel having an opening therein, a removable face plate hermetically sealing said opening, an ion beam transmitter disposed within said vessel and mounted on said face plate, an ion receiver disposed within said vessel and mounted on said face plate, and means carried by said face plate adapted to engage and support said upper and lower walls when said face plate is in place.

5. A calutron comprising means defining a vessel and including upper and lower walls, said vessel having an opening therein, a removable face plate hermetically sealing said opening, an ion beam transmitter disposed within said vessel and mounted on said face plate, an ion receiver disposed within said vessel and mounted on said face plate, and means carried by said face plate adapted to engage and support said upper and lower walls when said face plate is in place, and a hollow liner extending between said transmitter and said receiver and supported by said face plate.

6. A calutron comprising means defining a vessel and including upper and lower walls, said vessel having an opening therein, a removable face plate hermetically sealing said opening, an ion beam transmitter disposed within said vessel and mounted on said face plate, an ion receiver disposed within said vessel and mounted on said face plate, and a hollow liner extending between said transmitter and said receiver, a support frame mounted on said face plate and supporting said liner in electrically insulated relation to said face plate and said vessel, and means carried by said support frame adapted to engage and support said upper and lower walls when said face plate is in place.

7. A calutron comprising means defining a vessel and including upper and lower walls, said vessel having an opening therein, a removable face plate hermetically sealing said opening, an ion beam transmitter disposed within said vessel and mounted on said face plate, an ion receiver disposed within said vessel and mounted on said face plate, a support frame mounted on said face plate, a hollow liner extending between said transmitter and said receiver and mounted on said support frame, and means carried by said support frame and mounted for limited vertical movement with respect thereto and adapted to engage and support said upper and lower walls against collapsing force when said face plate is in place.

8. A calutron comprising means defining a vessel and including upper and lower walls, said vessel having an opening therein, a removable face plate hermetically sealing said opening, an ion beam transmitter disposed within said vessel and mounted on said face plate, an ion receiver disposed within said vessel and mounted on said face plate, a support frame mounted on said face plate, a hollow liner extending between said transmitter and said receiver and mounted on said support frame, and a pair of columns mounted on said support frame for limited vertical movement with respect thereto and adapted to engage and support said upper and lower walls when said face plate is in place.

9. A calutron comprising a vessel provided with an opening, a removable face plate hermetically sealing said opening, a pair of ion beam transmitters disposed within said vessel and mounted on said face plate, a corresponding pair of ion receivers disposed within said vessel and mounted on said face plate and a hollow liner extending between said transmitters and said receivers and supported by said face plate.

10. A calutron comprising a vessel provided with an opening, a removable face plate hermetically sealing said opening, a pair of ion beam transmitters disposed within said vessel and mounted on said face plate, a corresponding pair of ion receivers disposed within said vessel and mounted on said face plate and a hollow liner extending between said transmitters and said receivers in electrically insulated relation thereto and supported by said face plate.

11. A calutron comprising a vessel provided with an opening, a removable face plate hermetically sealing said opening, an ion beam transmitter disposed within said vessel and mounted on said face plate, an ion receiver disposed within said vessel and mounted on said face plate, a hollow liner extending between said transmitter and said receiver, a support frame mounted on said face plate and supporting said liner in electrically insulated relation to said face plate and said vessel, a plurality of guide tracks associated with said vessel, wheels carried by said face plate and adapted to engage associated guide tracks and a wheel carried by said support frame and adapted to engage an associated guide track whereby said face plate, transmitter, receiver and liner are mounted for horizontal movement into and out of sealing relation with said vessel.

12. A calutron comprising a vessel provided with an opening, a removable face plate hermetically sealing said opening, an ion beam transmitter disposed within said vessel and mounted on said face plate, an ion receiver disposed within said vessel and mounted on said face plate, a hollow liner extending between said transmitter and said receiver, a support frame mounted on said face plate and supporting said liner in electrically insulated relation to said face plate and said vessel, a plurality of guide tracks associated with said vessel, wheels carried by said face plate and adapted to engage associated guide tracks, a wheel carried by said support frame and adapted to engage an associated guide track whereby said face plate, transmitter, receiver and liner are mounted for horizontal movement into and out of sealing relation with said vessel, and means associated with said last-mentioned wheel for adjusting said support frame vertically with respect to said vessel.

13. A calutron comprising a substantially fluid-tight tank having an open side, a massive face plate removably secured to said tank in closing relation to the open side thereof, ion separating mechanism carried by said face plate and projecting within said tank when said face plate is secured thereto, and means associated with said tank and face plate effective to guide said face plate during removal from said tank.

14. A calutron comprising a substantially fluid-tight tank having an open side, a massive face plate removably secured to said tank in closing relation to the open side thereof, ion separating mechanism carried by said face plate and projecting within said tank when said face plate is secured thereto, and means associated with said tank and face plate effective to guide said face plate rectilinearly away from said tank during removal from said tank.

15. A calutron comprising a substantially fluid-tight tank having an open side, a massive face plate removably secured to said tank in closing relation to the open side thereof, ion separating mechanism carried by said face plate and projecting within said tank when said face plate is secured thereto, and means carried by said tank and face plate effective to guide said face plate rectilinearly away from said tank during removal from said tank.

16. A calutron comprising a substantially fluid-tight tank having an open side, a massive face plate removably secured to said tank in closing relation to the open side thereof, ion separating mechanism carried by said face plate and projecting within said tank when said face plate is secured thereto, means carried by said tank and face plate effective to guide said face plate rectilinearly away from said tank during removal from said tank, said means comprising horizontally extending guiding structure, and supporting means carried by the face plate movable therealong.

17. A calutron comprising a vessel provided with an opening, a removable face plate hermetically sealing said opening, an ion beam transmitter disposed within said vessel and mounted on said face plate, an ion receiver disposed within said vessel and mounted on said face plate, a support frame extending into said vessel and mounted on said face plate, a hollow C-shaped liner extending between said transmitter and said receiver and supported by said support frame in electrically insulated relation thereto, and a tie-bar positioned substantially across the diameter of said liner and insulatedly supported by said support frame.

No references cited.